(12) United States Patent
Chuang

(10) Patent No.: US 11,485,439 B2
(45) Date of Patent: Nov. 1, 2022

(54) BIKE CARGO RACK

(71) Applicant: Louis Chuang, Taichung (TW)

(72) Inventor: Louis Chuang, Taichung (TW)

( * ) Notice: Subject to any disclaimer, the term of this patent is extended or adjusted under 35 U.S.C. 154(b) by 96 days.

(21) Appl. No.: 17/073,507

(22) Filed: Oct. 19, 2020

(65) Prior Publication Data

US 2021/0291920 A1 Sep. 23, 2021

(30) Foreign Application Priority Data

Mar. 19, 2020 (TW) ................................ 109109201

(51) Int. Cl.
*B62J 7/04* (2006.01)
*B62J 7/00* (2006.01)
*B62J 15/00* (2006.01)

(52) U.S. Cl.
CPC . *B62J 7/00* (2013.01); *B62J 7/04* (2013.01); *B62J 15/00* (2013.01)

(58) Field of Classification Search
CPC ....... B62J 7/04; B62J 7/06; B62J 15/00; B62J 15/02
USPC ................. 224/441, 446, 452, 422, 424, 427
See application file for complete search history.

(56) References Cited

U.S. PATENT DOCUMENTS

| 5,649,657 A * | 7/1997 | Chuang ...................... B62J 7/00 224/430 |
| 5,931,361 A | 8/1999 | Schwimmer |
| 2006/0138185 A1* | 6/2006 | Lien .......................... B62J 7/04 224/427 |
| 2020/0324842 A1 | 10/2020 | Chuang |

FOREIGN PATENT DOCUMENTS

| CN | 2483296 Y | 3/2002 | |
| CN | 107226153 A * | 10/2017 | ............... B62J 7/04 |
| DE | 29510801 U * | 10/1995 | |
| DE | 19717570 A1 | 10/1998 | |
| DE | 29911818 U1 * | 8/1999 | ............... B62J 7/04 |
| EP | 3241727 A1 * | 11/2017 | ............... B62J 7/02 |
| EP | 3351466 A1 | 3/2020 | |
| FR | 2979324 A1 | 3/2013 | |
| JP | 2004268670 A * | 9/2004 | |
| TW | M312485 U | 5/2007 | |
| TW | 371675 B1 * | 9/2012 | |
| TW | M557220 U | 3/2018 | |
| TW | M586690 U | 11/2019 | |
| WO | WO2017203544 A1 | 11/2017 | |

* cited by examiner

*Primary Examiner* — Scott T McNurlen
(74) *Attorney, Agent, or Firm* — Alan D. Kamrath; Karin L. Williams; Mayer & Williams PC

(57) ABSTRACT

A bike cargo rack includes a platform and a movable body movably and releasably connected to the platform. The movable body includes a first stop adapted to be restrained by a first end of the platform. The movable body includes a second stop abutted by a second end of the platform after the first end of the platform restraining the first stop. The first and the second stops are disposed on opposite ends of the movable body.

7 Claims, 6 Drawing Sheets

BIKE CARGO RACK

BACKGROUND OF THE INVENTION

1. Field of the Invention

The present invention relates to a cargo rack and, particularly, to a bike cargo rear rack.

2. Description of the Related Art

TW Pat. No. M586690 shows a rack assembly including a rack and an L-shaped carrying shelf or a water bottle holder coupled to the rack. Although a fastening rope can be used to secure an object to be carried on the carrying shelf, it is burdensome.

The present invention is, therefore, intended to obviate or at least alleviate the problems encountered in the prior art.

SUMMARY OF THE INVENTION

According to the present invention, a bike cargo rack has a platform and a movable body movably and releasably connected to the platform. The movable body includes a first stop adapted to be restrained by a first end of the platform to prevent release from the platform. The movable body includes a second stop abutted by a second end of the platform after the first end of the platform restraining the first stop. The first and the second stops are disposed on opposite ends of the movable body.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the public generally, and especially the scientists, engineers and practitioners in the art who are not familiar with patent or legal terms or phraseology, to determine quickly from a cursory inspection the nature and essence of the technical disclosure. The abstract is neither intended to define the invention, which is measured by the claims, nor is it intended to be limiting as to the scope of the invention in any way.

Other objectives, advantages, and new features of the present invention will become apparent from the following detailed description of the invention when considered in conjunction with the accompanied drawings.

DETAILED DESCRIPTION OF THE INVENTION

Figure 1:
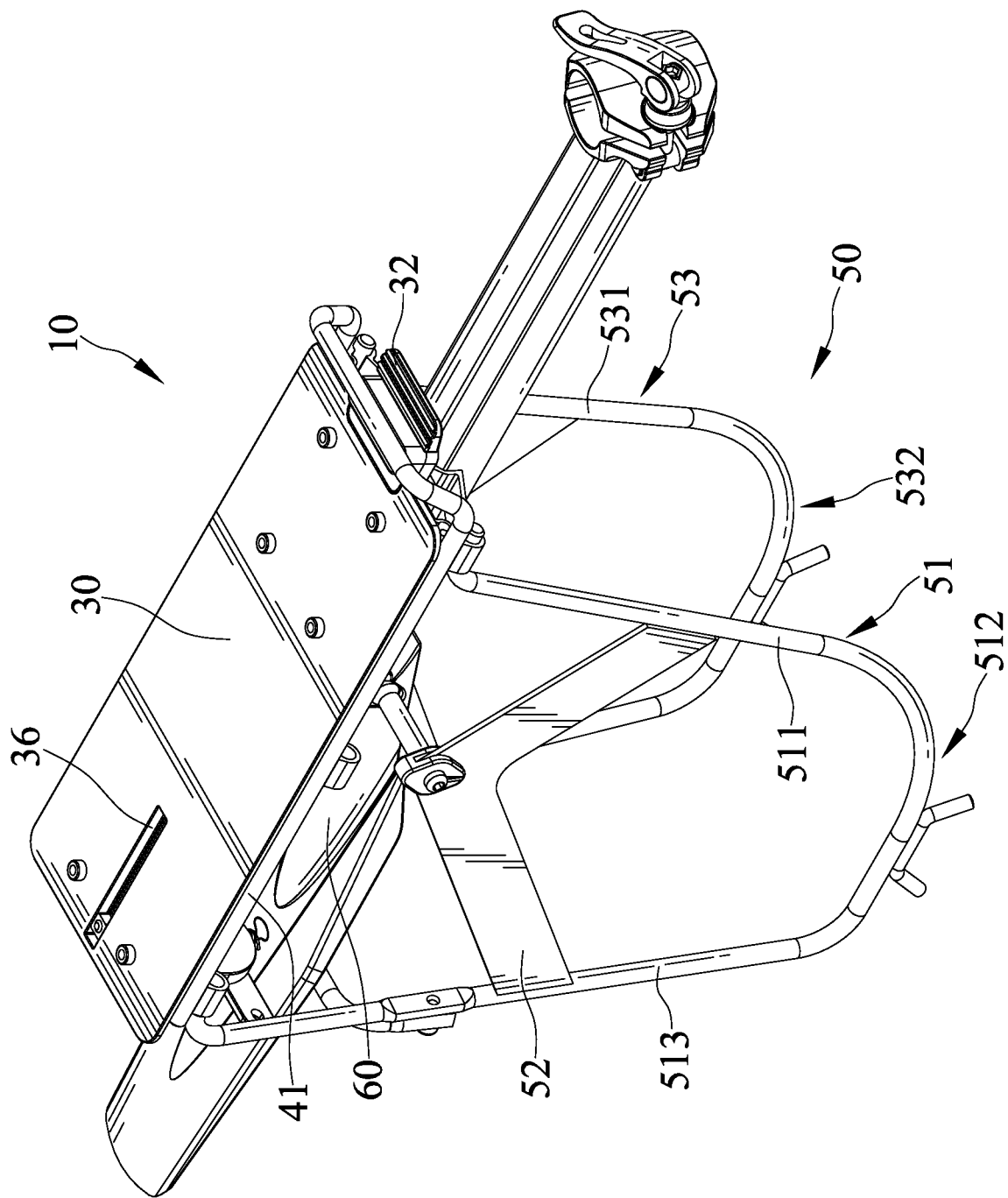
FIG. 1 is a perspective view of a bike cargo rack in accordance with a first embodiment of the present invention.
Figure 2:
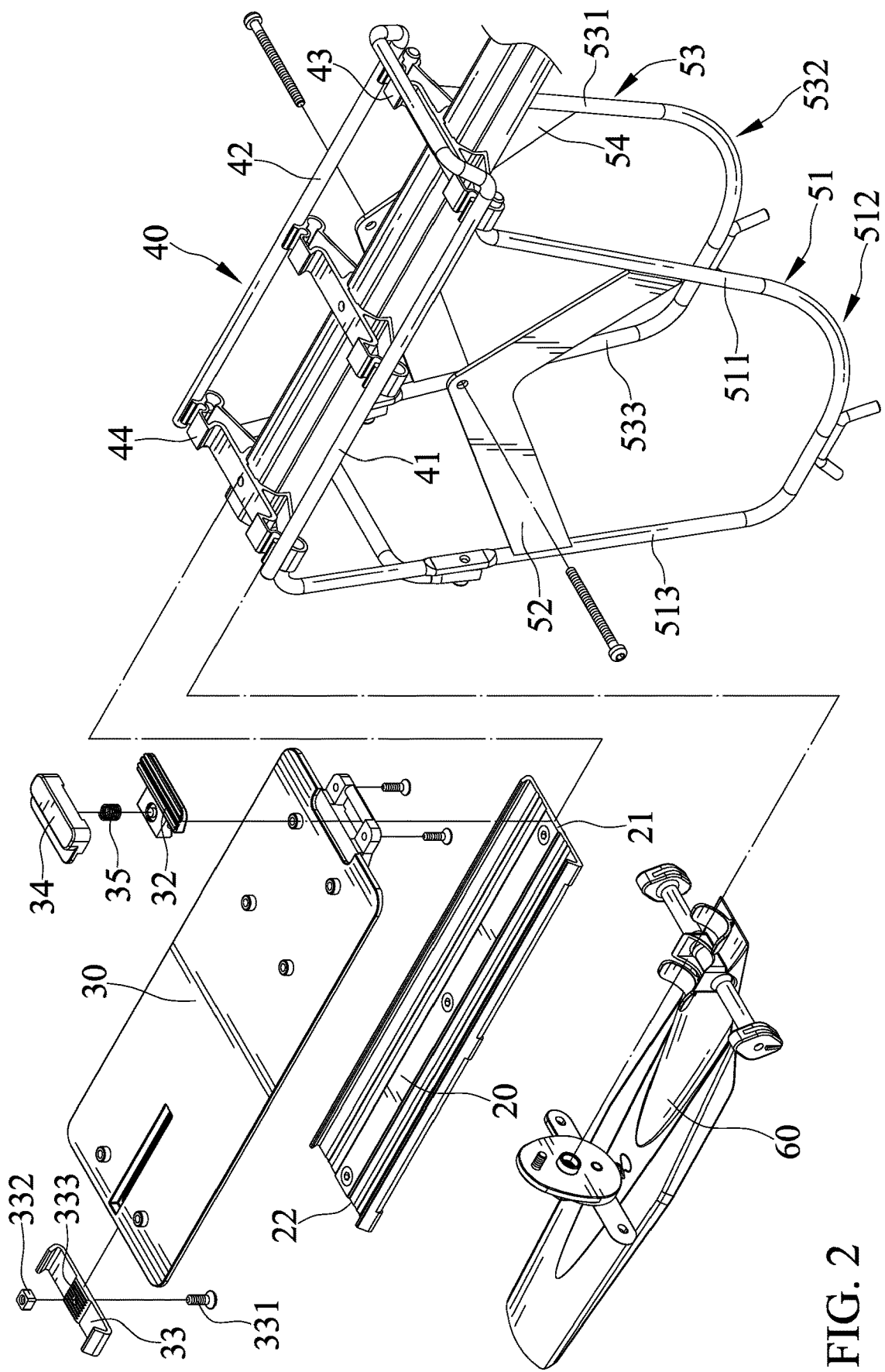
FIG. 2 is an exploded perspective view of the bike cargo rack of FIG. 1.
Figure 3:
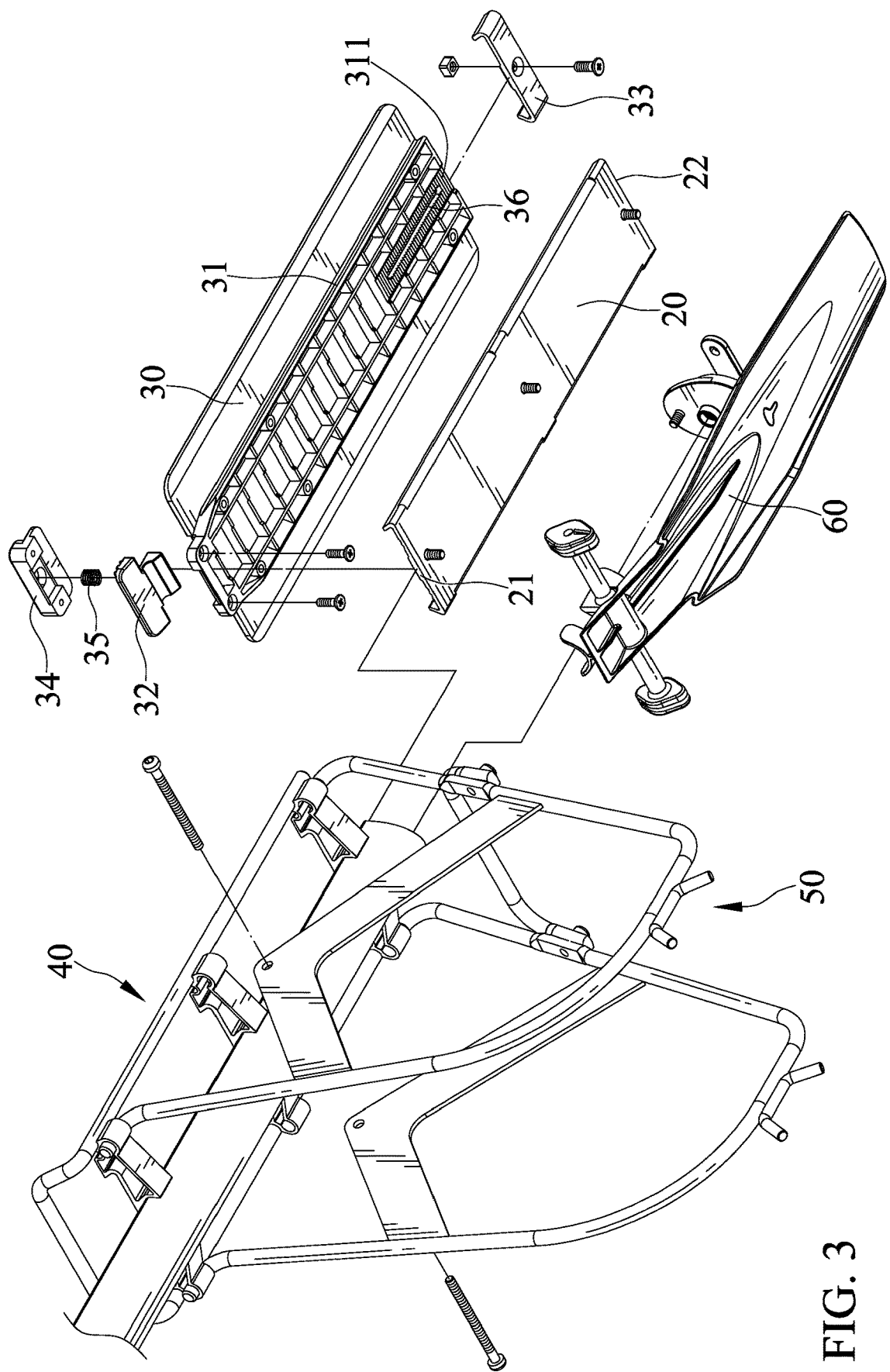
FIG. 3 is an exploded perspective view of the bike cargo rack of FIG. 1 viewed from a different angle than FIG. 2.
Figure 4:
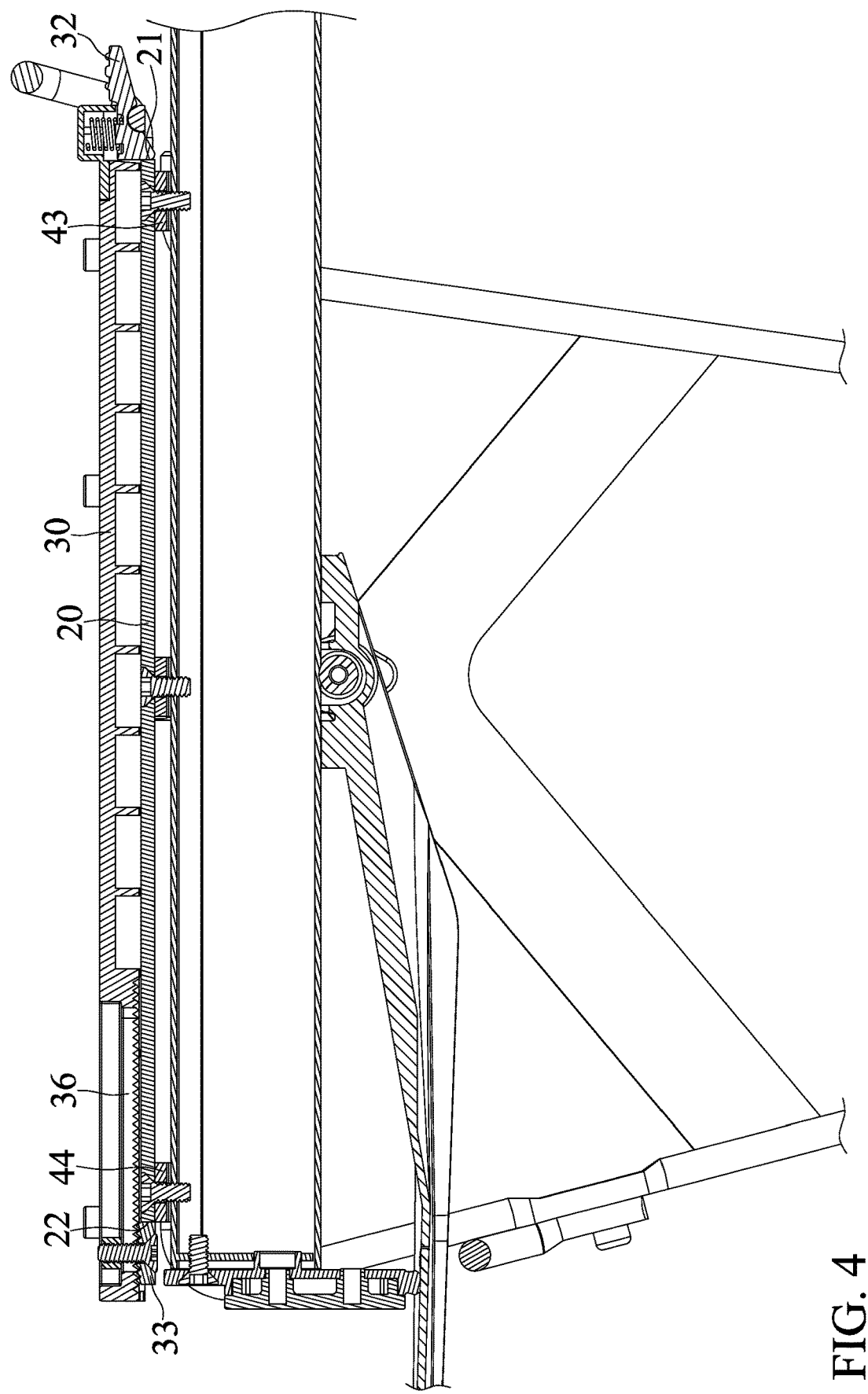
FIG. 4 is a cross-sectional view of the bike cargo rack of FIG. 1.

FIGS. 1 through 4 show a bike cargo rack 10 in accordance with a first embodiment of the present invention including a platform 20 and a movable body 30.

The platform 20 has an end 21 and an end 22 on opposite ends. The platform 20 extends longitudinally from the end 21 to the end 22, The platform 20 is dovetail-shaped in cross section.

The movable body 30 is movably and releasably connected to the platform 20. The movable body 30 has a connecting portion 31 for connecting to the platform 20. Particularly, the connecting portion 31 defines grooves in which lateral sides of the platform 20 are engaged.

The movable body 30 includes a stop 32 adapted to be restrained by the end 21 of the platform 20 to prevent release from the platform 20. The stop 32 is rotatably connected to the movable body 30 and rotatable between a first position in which the platform 20 restrains the movable body 30, and a second position in which the platform 20 does not restrain movable body 30. Moreover, the movable body 30 provides a fulcrum about which the stop 32 is rotatably mounted. Furthermore, the stop 32 is urged by a resilient member 35. The resilient member 35 includes one end retained on the stop 32 and another end retained on a cover 34 which has an end integrated with the movable body 30.

The movable body 30 includes a stop 33 abutted by the end 22 of the platform 20 after the end 21 of the platform 20 restraining the stop 32. The stop 33 is dovetail-shaped in cross section. The end 22 of the platform 20 and the stop 33 have similar shapes. The stops 32 and 33 are disposed on opposite ends of the movable body 30. The stop 33 is movably connected and selectively fixed to the movable body 30. Thus, the stop 33 can be adjusted to various fixed positions. In this regard, the platform's 20 longitudinal size, i.e. the length between the ends 21 and 22, and the position of the stop 33 change correspondingly. Further, a fastener 331 and a retainer 332 cooperate to fasten the stop 33 to the movable body 30. Furthermore, the movable body 30 defines a slot 36 in which the retainer 332 is movably disposed and the fastener 331 has an end inserted in the slot 36 and engaged with the retainer 332. The slot 36 extends through the connecting portion 31 of the movable body 30.

Furthermore, the movable body 30 and the stop 33 respectively have a non-skid portion 311 and 333 and the non-skid portion 311 of the movable body 30 is frictionally engaged with the non-skid portion 333 of the stop 33 to prevent the stop 33 from inadvertent movement with respect to the movably body 30. The non-skid portions 311 and 333 are uneven surfaces.

The bike cargo rack 10 includes a rack frame with a supporting portion 40a supporting the platform 20 and a mounting portion 50 which is used for connecting to a bike. The supporting portion 40 includes a lateral frame section 41 and a lateral frame section 42 on opposite sides. The supporting portion 40 also includes and a transverse frame section 43 and a transverse frame section 44 extending between the lateral frame sections 41 and 42 transversely. The transverse frame sections 43 and 44 bear the platform 20. The transverse frame section 43 is adjacent to the end 21 of the platform 20 and spaced from the stop 32.

A mudguard 60 is connectible to the bike cargo rack 10. The mudguard 60 is connected to the mounting portion 50. The mounting portion 50 is comprised of two rack mount frames 51 and 53. Each of the two rack mount frames 51 and 53 includes a frame section 511 and 531, a frame section 512 and 532, and a frame section 513 and 533 connected with one another sequentially. The supporting portion 40 is adjacent to first ends of the frame sections 511, 531, 513, and 533 of corresponding rack mount frames 51 and 53. Each of the two rack mount frames 51 and 53 includes the frame section 512 and 532 extending between second ends of the frame sections 511, 531, 513, and 533. Each of the two rack mount frames 51 and 53 includes a lateral surface 52 and 54 to which the mudguard 60 is connected. Each of the two rack mount frames 51 and 53 includes the lateral surface 52 and 54 extending between the frame sections 511, 531, 513, and 533.

Figure 5:
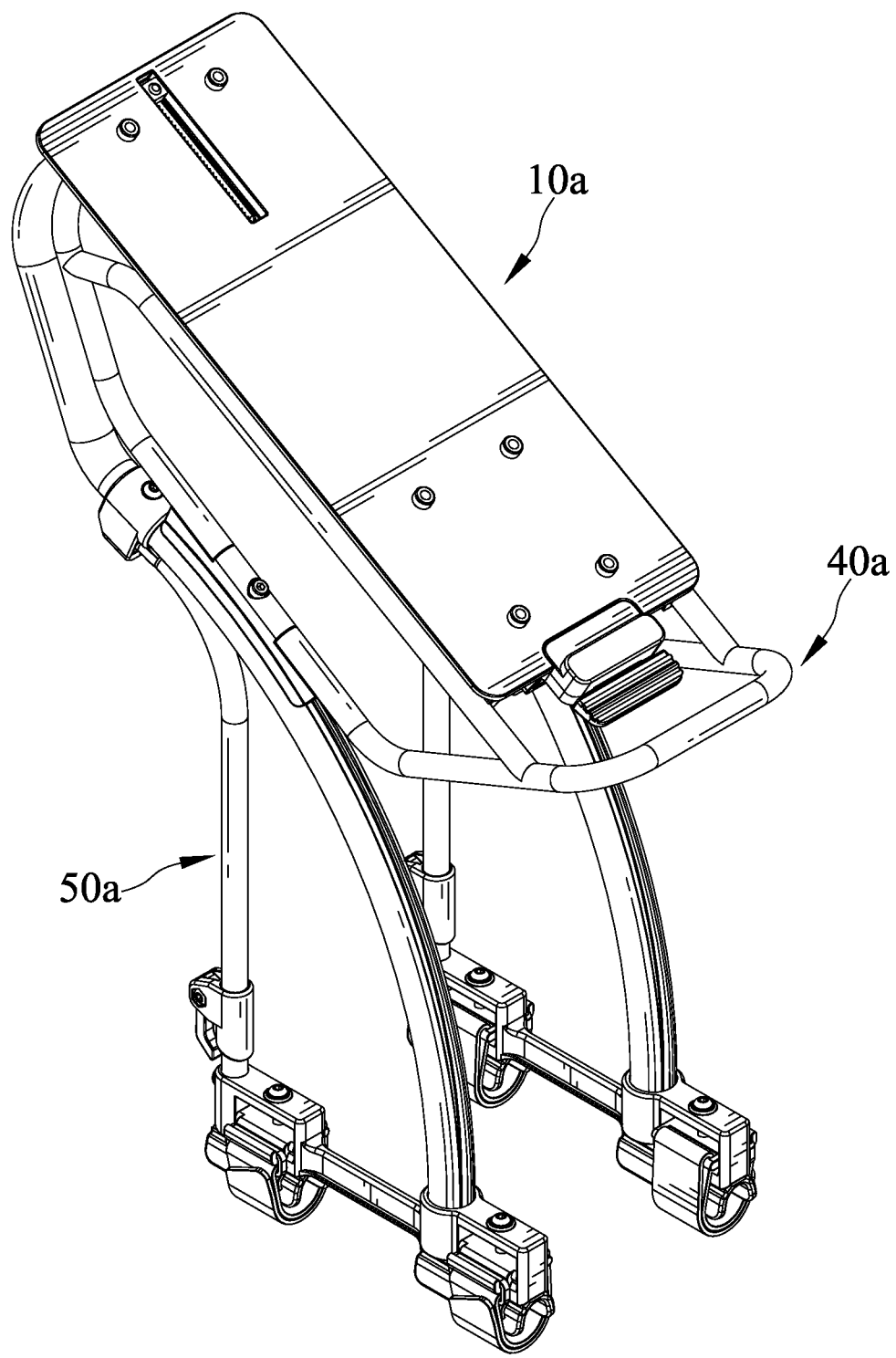
FIG. 5 is a perspective view of a bike cargo rack in accordance with a second embodiment of the present invention.
Figure 6:
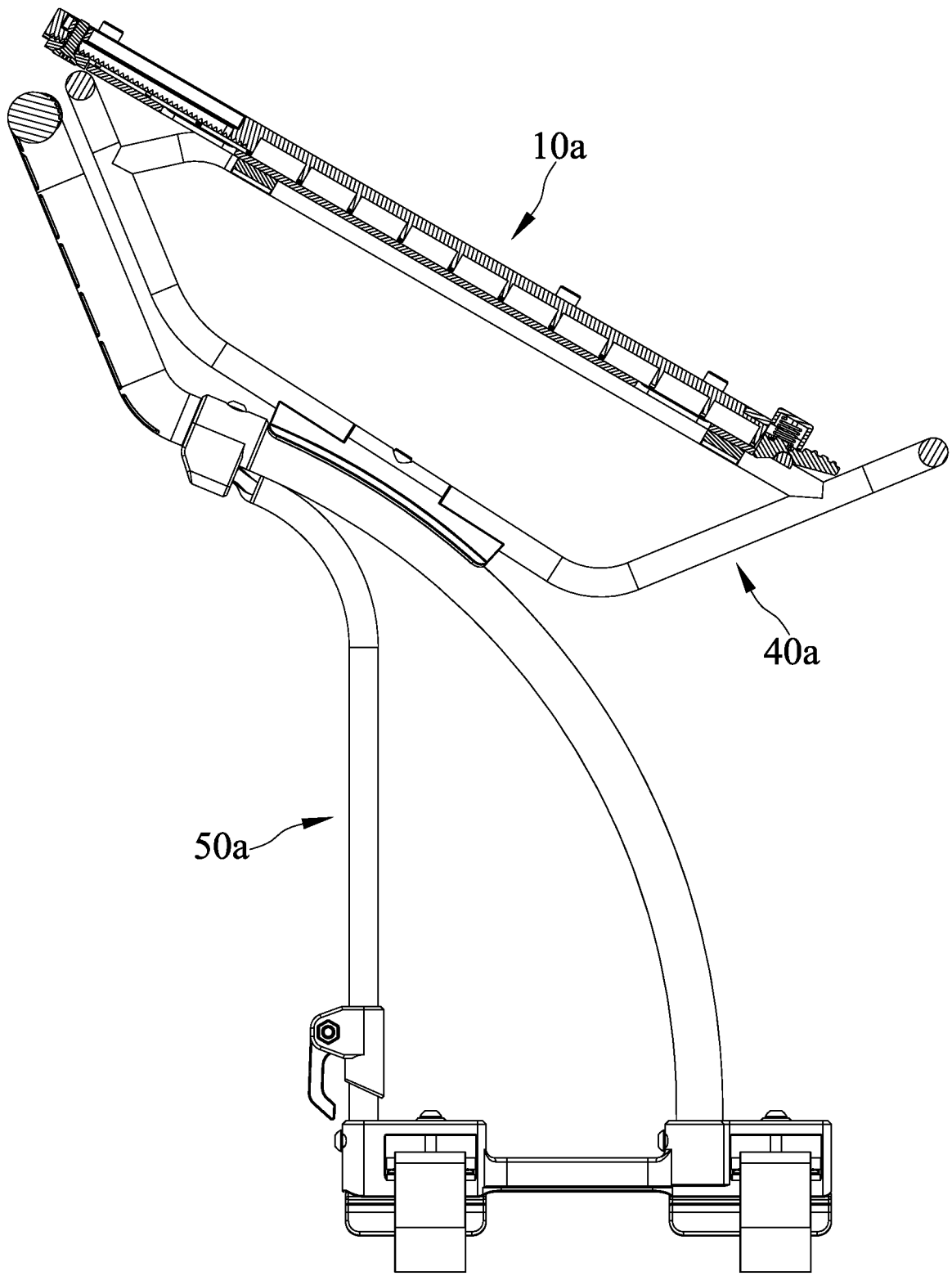
FIG. 6 is a cross-sectional view of the bike cargo rack of FIG. 5.

FIGS. 5 and 6 show a bike cargo rack 10a in accordance with a first embodiment of the present invention, and the same numbers are used to correlate similar components of the first embodiment, but bearing a letter a. The bike cargo rack 10a differentiates from the bike cargo rack 10 in that a rack frame includes a supporting portion 40a adapted to be changed to different positions on a mounting portion 50a. Preferably, the supporting portion 40a is movably connected to the mounting portion 50a. Preferably, the mounting portion 50a has a curved section and the supporting portion 40a is movable along the curved section for different angular positions.

In view of the foregoing, the movable body 30 can be quickly connected to and disconnected from the platform 20. Particularly, the movable body 30 includes the stop 32 adapted to be restrained by the end 21 of the platform 20 to prevent release from the platform 20. Furthermore, the movable body 30 includes the stop 33 abutted by the end 22 of the platform 20 after the end 21 of the platform 20 restraining the stop 32.

The foregoing is merely illustrative of the principles of this invention and various modifications can be made by those skilled in the art without departing from the scope and spirit of the invention.

What is claimed is:

1. A bike cargo rack comprising:
   a platform;
   a movable body movably and releasable connected to the platform, wherein the movable body includes a first stop adapted to be restrained by a first end of the platform to prevent release from the platform, wherein the movable body includes a second stop abutted by a second end of the platform after the first end of the platform restraining the first stop, wherein the first and the second stops are disposed on opposite ends of the movable body, wherein the first stop is rotatably connected to the movable body and rotatable between a first position in which the platform restrains the movable body, and a second position in which the platform does not restrain the movable body, wherein the movable body provides a fulcrum about which the first stop is rotatably mounted, wherein the first stop is urged by a resilient member, wherein the resilient member includes one end retained on the first stop and another end retained on a cover which has an end integrated with the movable body, and wherein the second stop is movably connected and selectively-fixed to the movable body; and
   a fastener and a retainer cooperating to fasten the second stop to the movable body, wherein the movable body defines a slot in which the retainer is movably disposed and the fastener has an end inserted in the slot and engaged with the retainer.

2. The bike cargo rack as claimed in claim 1, wherein the movable body and the second stop respectively have a non-skid portion and the non-skid portion of the movable body is frictionally engaged with the non-skid portion of the second stop to prevent the second stop from inadvertent movement with respect to the movable body.

3. A bike cargo rack comprising:
   a platform;
   a movable body movably and releasably connected to the platform, wherein the movable body includes a first stop adapted to be restrained by a first end of the platform to prevent release from the platform, wherein the movable body includes a second stop abutted by a second end of the platform after the first end of the platform restraining the first stop, wherein the first and the second stops are disposed on opposite ends of the movable body, wherein the first stop is rotatably connected to the movable body and rotatable between a first position in which the platform restrain the movable body, and a second position in which the platform does not restrain the movable body, wherein the movable body provides a fulcrum about which the first stop is rotatably mounted, wherein the first stop is urged by a resilient member, wherein the resilient member includes one end retained on the first stop and another end retained on a cover which has an end integrated with the movable body, and wherein the second stop is movably connected and selectively fixed to the movable body;
   a rack frame with a supporting portion supporting the platform and a mounting portion which is used for connecting to a bike, wherein the supporting portion includes a first and a second lateral frame section on opposite sides and a first and a second transverse frame section extending between the first and second lateral frame sections transversely, and wherein the first transverse frame section is adjacent to the first end of the platform and spaced from the first stop; and
   a fastener and a retainer cooperating to fasten the second stop to the movable body, wherein the movable body defines a slot in which the retainer is movably disposed and the fastener has an end inserted in the slot and engaged with the retainer.

4. The bike cargo rack as claimed in claim 3 further comprising a mudguard connected thereto, wherein the mudguard is connected to the mounting portion, wherein the mounting portion is comprised of two rack mount frames, wherein each of the two rack mount frames includes a first, a second, and a third frame section connected with one another sequentially, wherein the supporting portion is adjacent to first ends of the first and the third frame sections of corresponding rack mount frames, wherein each of the two rack mount frames includes the second frame section extending between second ends of the first and third frame sections, wherein each of the two rack mount frames includes a lateral surface to which the mudguard is connected, and wherein each of the two rack mount frames includes the lateral surface extending between the first and the third frame sections.

5. The bike cargo rack as claimed in claim 3, wherein the supporting portion is adapted to be changed to different positions on the mounting portion.

6. The bike cargo rack as claimed in claim 5, wherein the supporting portion is movably connected to the mounting portion.

7. The bike cargo rack as claimed in claim 3, wherein the movable body and the second stop respectively have a non-skid portion and the non-skid portion of the movable body is frictionally engaged with the non-skid portion of the second stop to prevent the second stop from inadvertent movement with respect to the movable body.

* * * * *